(12) United States Patent
Gelter

(10) Patent No.: US 9,357,320 B2
(45) Date of Patent: May 31, 2016

(54) HEADPHONE LISTENING APPARATUS

(71) Applicant: Harman International Industries, Inc., Stamford, CT (US)

(72) Inventor: Aaron Gelter, West Jordan, UT (US)

(73) Assignee: Harmon International Industries, Inc., Stamford, CT (US)

( * ) Notice: Subject to any disclaimer, the term of this patent is extended or adjusted under 35 U.S.C. 154(b) by 22 days.

(21) Appl. No.: 14/312,914

(22) Filed: Jun. 24, 2014

(65) Prior Publication Data

US 2015/0373467 A1 Dec. 24, 2015

(51) Int. Cl.
| | |
|---|---|
| *H04R 29/00* | (2006.01) |
| *H04R 1/10* | (2006.01) |
| *G06F 17/30* | (2006.01) |
| *H04R 5/04* | (2006.01) |

(52) U.S. Cl.
CPC .......... *H04R 29/00* (2013.01); *G06F 17/30743* (2013.01); *H04R 1/1091* (2013.01); *H04R 5/04* (2013.01); *H04R 2420/01* (2013.01); *H04R 2460/03* (2013.01)

(58) Field of Classification Search
None
See application file for complete search history.

(56) References Cited

U.S. PATENT DOCUMENTS

| | | | |
|---|---|---|---|
| 5,647,011 A | 7/1997 | Garvis | |
| 6,360,187 B1 | 3/2002 | Hermann | |
| 7,986,791 B2 * | 7/2011 | Bostick | H03G 3/32 381/171.6 |
| 8,068,025 B2 * | 11/2011 | Devenyi | H04R 1/1041 324/76.31 |
| 8,126,159 B2 | 2/2012 | Goose et al. | |
| 8,194,865 B2 * | 6/2012 | Goldstein | H04R 1/1091 381/56 |
| 8,868,137 B2 * | 10/2014 | Hicks, III | G10K 11/1788 368/11 |
| 9,041,545 B2 * | 5/2015 | Zelepugas | H04R 1/1041 340/573.1 |
| 2001/0046304 A1 | 11/2001 | Rast | |
| 2004/0179694 A1 * | 9/2004 | Alley | H03G 3/342 381/55 |
| 2007/0116316 A1 | 5/2007 | Goldberg | |
| 2010/0033313 A1 | 2/2010 | Keady et al. | |
| 2010/0329488 A1 | 12/2010 | Holub | |
| 2013/0170662 A1 | 7/2013 | Koga et al. | |
| 2014/0044269 A1 | 2/2014 | Anderson | |
| 2014/0064511 A1 | 3/2014 | Desai | |
| 2014/0185828 A1 * | 7/2014 | Helbling | H03G 5/165 381/103 |

(Continued)

FOREIGN PATENT DOCUMENTS

| | | |
|---|---|---|
| JP | 08002339 A | 1/1996 |
| WO | 0074013 A1 | 12/2000 |
| WO | 2012097150 A1 | 7/2012 |

OTHER PUBLICATIONS

U.S. Office Action for U.S. Appl. No. 14/086,828, mailed Aug. 7, 2015, 15 pages.

(Continued)

*Primary Examiner* — Paul Huber
(74) *Attorney, Agent, or Firm* — Brooks Kushman P.C.

(57) ABSTRACT

In at least one embodiment, a headphone listening apparatus including an audio listening device is provided. The audio listening device is programmed to receive an incoming ambient audio signal indicative of an external ambient sound and to store a plurality of desired audio triggers. The audio listening device is further programmed to compare the external ambient sound to the plurality of desired audio triggers and to transmit a notification signal to headphones in response to the ambient sound being generally similar to a first desired audio trigger of the plurality of desired audio triggers. The headphones are programmed to provide an audio alert to a user to indicate the presence of the external ambient sound.

19 Claims, 3 Drawing Sheets

(56) References Cited

U.S. PATENT DOCUMENTS

2015/0137998 A1    5/2015  Marti et al.
2015/0222977 A1*   8/2015  Angel, Jr. ............... H04R 1/105
                                                        381/74

OTHER PUBLICATIONS

Extended European Search Report for Application No. 15173228.6, mailed Nov. 16, 2015, 8 pages.
Extended European Search Report for Application No. 14192669.1, mailed Nov. 4, 2015, 6 pages.

* cited by examiner

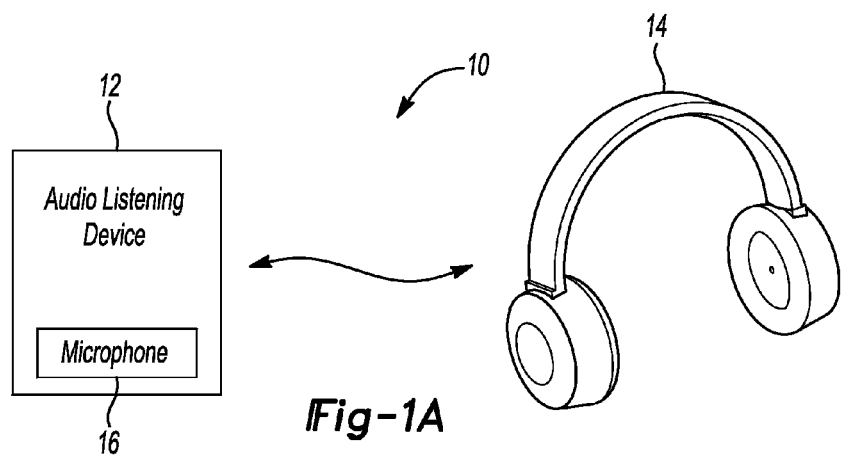
*Fig-1A*
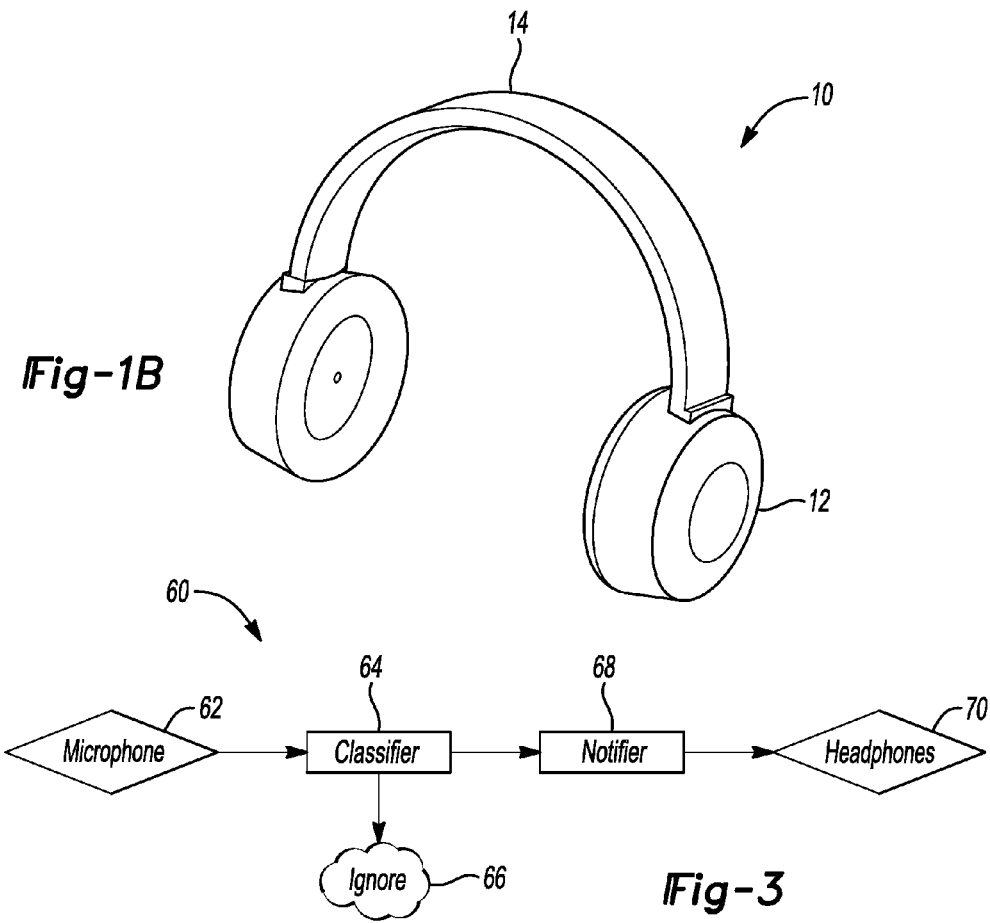
*Fig-1B*
*Fig-3*

HEADPHONE LISTENING APPARATUS

TECHNICAL FIELD

Aspects disclosed herein generally relate to a listening mode of a headphone such that the headphone is capable of notifying a user when predetermined ambient sound (or desired audio trigger) is detected. These aspects and others will be discussed in more detail herein.

BACKGROUND

As is known, headphones include speakers to privately play back audio data for a user. Specifically, headphones isolate the user or listener from the outside world. Ambient sounds that are generated and transmitted around the user are significantly attenuated by the headphone (or an earbud housing) and then further attenuated by the music or other media being played back by the headphone. There are times, however, when the user may be interested in the ambient sounds that are generated or transmitted exterior to the headphones.

SUMMARY

In at least one embodiment, a headphone listening apparatus including an audio listening device is provided. The audio listening device is programmed to receive an incoming ambient audio signal indicative of an external ambient sound and to store a plurality of desired audio triggers. The audio listening device is further programmed to compare the external ambient sound to the plurality of desired audio triggers and to transmit a notification signal to headphones in response to the ambient sound being generally similar to a first desired audio trigger of the plurality of desired audio triggers. The headphones are programmed to provide an audio alert to a user to indicate the presence of the external ambient sound.

In at least another embodiment, a computer-program product embodied in a non-transitory computer readable medium that is programmed for headphone listening is provided. The computer-program product includes instructions to receive an incoming ambient audio signal indicative of an external ambient sound and to compare the external ambient sound to a plurality of desired audio triggers stored in memory. The computer-program product further includes instructions to transmit a notification signal to headphones in response to the ambient sound being generally similar to a first desired audio trigger of the plurality of desired audio triggers. The headphones are configured to provide an audio alert to a user to indicate the presence of the external ambient sound.

In at least another embodiment, a headphone listening apparatus including headphones is provided. The headphones are programmed to receive a notification signal from an audio listening device that (i) receives an incoming ambient audio signal indicative of an external ambient sound, (ii) compares the external ambient sound to a plurality of desired audio triggers stored in memory thereof, and (iii) transmits the notification signal to the headphone in response to the ambient sound being generally similar to a first desired audio trigger of the plurality of desired audio triggers. The headphones are further programmed to provide an audio alert to a user to indicate the presence of the external ambient sound.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIGS. 1A-1B depict a headphone listening mode system in accordance to one embodiment;

FIG. 3 generally depicts an operation flow of one aspect of the headphone listening mode system in accordance to one embodiment;

DETAILED DESCRIPTION

Figure 2:
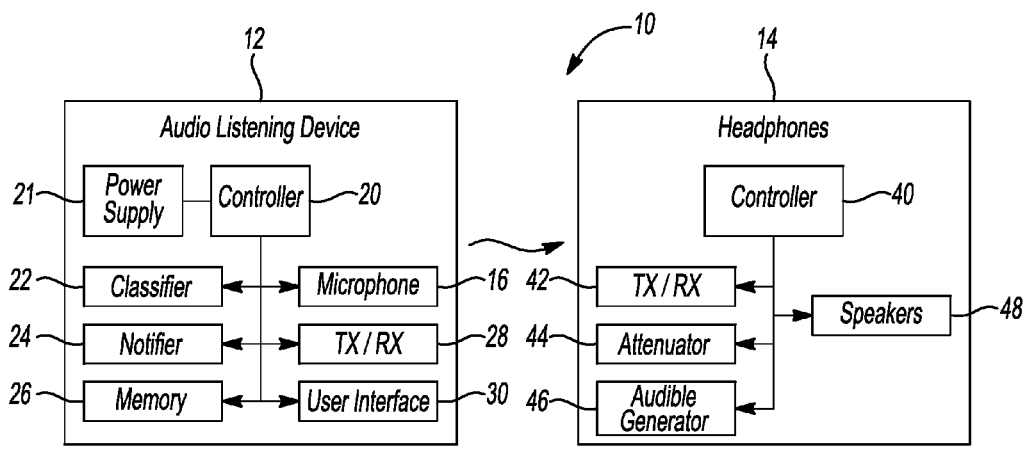
FIG. 2 depicts a more detailed implementation of the headphone listening mode system in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices may be configured to execute a computer-program that is embodied in a non-transitory computer readable medium that is programmed to perform any number of the functions as disclosed.

In general, many audio listening devices (e.g., cell phones, iPods®, notebooks, computers, etc.) and/or headphones that are used by users to listen to music include a microphone. With the use of a microphone, instructions may be provided such that when executed on a controller, the headphones are placed into a "listening mode." While in the listening mode, the audio listening device or the headphones may utilize the microphone to capture or listen to ambient sounds that are generated exterior to the headphones while the user listens to audio data via the headphones. The audio listening device and/or the headphones may compare the captured ambient sound to previously stored sounds (or desired audio triggers) that are deemed to have priority such as a doorbell, certain human voices, baby crying, etc. If the captured ambient sound is detected to match a corresponding desired audio trigger, such a condition is used to notify the user via the headphones during audio playback that an ambient sound of interest to the user has been detected. In this case, the audio listening device may transmit the captured ambient sound to the headphones. The headphones then play back the captured ambient sound to alert the user of the activity outside of the headphones.

It is recognized that the audio listening device and/or the headphones may perform one or more of the operations as noted herein. It is further recognized that the audio listening device may include an intermediate device (not shown) that may be positioned between the audio listening device and the headphones to perform the listening of the incoming ambient sounds and the comparing of the incoming ambient sounds to the desired audio triggers. For example, the intermediate device may be sold as an accessory that can be connected to the audio listening device and the headphones for performing the listening of the incoming ambient sounds and the comparison of the incoming ambient sounds.

Alternatively, the headphone may provide any number of audible alerts that may be mixed with the played back audio to alert the user that an ambient sound of interest was detected. If the audible alert is mixed with the audio data that is being played back, the headphones may attenuate the main audio that is being played back to ensure perception such that the user is notified that the ambient noise of interest has been detected. One or more embodiments utilize a classification and learning mechanism to determine when to notify the listener (or user). These aspects and others will be discussed in more detail below.

FIG. 1A depicts a headphone listening mode apparatus (hereafter "apparatus") 10 in accordance to one embodiment. The apparatus 10 includes an audio listening device 12 and headphones 14. In general, the audio listening device 12 is configured to transmit an audio signal to the headphones 14 for audio playback for a user (or listener in a listening mode). The audio listening device 12 may include, but is not limited to, a cell phone, an iPod®, a notebook, or a computer. The audio listening device 12 may wirelessly transmit the audio signal to the headphones 14. Alternatively, the audio listening device 12 may be coupled with the headphones 14 via a hardwired connection such as cables or wires.

The audio listening device 12 includes a microphone 16 for receiving ambient sounds in an environment exterior to the headphones 14. The audio listening device 12 compares the received ambient sound to a previously desired audio trigger to determine whether there is a match between the received ambient sound and the desired audio trigger. If there is a match, the audio listening device 12 transmits a notification signal to the headphones 14. The headphones 14 may then notify or alert the user that the received ambient sound matches the desired audio trigger. It is recognized that the desired audio triggers may be sounds such as, but not limited to, a doorbell, certain human voices, a baby crying, alarm for washer/dryer, alarm(s) for an oven, telephone ringing, knocking of a door, etc. It is recognized that the desired audio trigger may be various outside or exterior sounds such as a sound of an engine of a vehicle or a horn in addition to various industrial sounds such as alarms or other notifications from an industrial machine.

FIG. 1B depicts the apparatus 10 in accordance to another embodiment. In particular, the headphones 14 are illustrated to include the audio listening device 12. In other words, the headphones 14 as illustrated in FIG. 1B include or integrate the audio listening device 12 therein. In this case, the audio listening device 12 may include the microphone 16 to receive the ambient sounds in the environment exterior to the headphones 14 and further compare such ambient sounds to the desired audio trigger to determine if a match is detected. If a match is detected, a controller(s) (not shown) may control the headphones 14 to provide the notification to the listener.

FIG. 2 depicts a more detailed implementation of the apparatus 10 in accordance to one embodiment. The audio listening device 12 generally includes the microphone 16, a microcontroller 20 (or controller), a power supply 21, a classifier 22, a notifier circuit 24, memory 26, a transmitter/receiver (TX/RX) 28, and a user interface 30. The controller 20 is electrically coupled to the microphone 16, the classifier 22, the notifier circuit 24, the memory 26, the transmitter/receiver (TX/RX) 28, and the user interface 30. The power supply 21 powers the audio listening device 12 (e.g., the electrical devices located within the audio listening device 12). In general, the user may use the user interface 30 to record and store the desired audio trigger such that the audio listening device 12 notifies the headphones 14 when an incoming ambient audio signal matches a desired audio trigger during audio playback at the headphones 14.

The user may control the audio listening device 12 to enter into a configuration mode for storing the desired audio triggers by inputting a command via the user interface 30. The controller 20 receives a signal from the user interface 30 which indicates that the user desires to place the audio listening device 12 into the configuration mode. The controller 20 then controls the microphone 16 to receive the desired audio trigger. In addition, the controller 20 may also prompt the user via the user interface 30 to assign a priority level to the desired audio trigger and to further assign a tolerance level to the desired audio trigger. The tolerance level provides an indication of how precise the incoming ambient audio signal has to be with respect to the stored desired audio trigger in order to trigger an event when the headphones 14 are in a listening mode (e.g., the audio listening device 12 and the headphones 14 are playing back audio data for the user).

The tolerance level may be useful in the sense that the tolerance level allows the apparatus 10 to attempt to match the desired audio trigger while the apparatus 10 is in the listening mode based on a certain degree of accuracy. For example, if the desired audio trigger is the sound of a doorbell, a user may assign a relatively low (or tight) tolerance level in order to match the incoming ambient audio signal to the desired audio trigger when the apparatus 10 is in the listening mode as the sound of the doorbell is generally consistent and will not vary. In this case, it is not desirable to have a false match on another sound that is generally similar such as, perhaps an alarm associated with an oven, or an audible alert on a cell phone.

In one example, the tolerance level may be based on a percentage such as an accuracy percentage with respect to how close the incoming audio signal is in comparison to the stored desired audio trigger. In other words, the tolerance level selected may be a relative percent accuracy as ascertained by the audio listening device 12 for a particular desired audio trigger when compared to the stored or recorded desired audio trigger.

For some ambient sounds such as a doorbell, there may be one to three tones, the controller 20 may execute instructions for a Goertzel algorithm to determine if there is a match. For example, if the doorbell has three tones (e.g., tone A, tone B, and tone C), then the Goertzel algorithm, when executed, listens for the tone A. It is recognized that the Goertzel algorithm is not limited to detecting a match of only three tones. If the tone A is initially detected at the audio listening device 12, then the audio listening device 12 starts to listen for tone B, and so on. If the audio listening device 12 does not detect the next tone within a predetermined amount of time, then the Goertzel algorithm is reset at the audio listening device 12. The audio listening device 12 may execute other algorithms for more tones that are more complex. For example, the audio listening device 12 (e.g., the classifier 22) may execute a Fast Fourier Transform (FFT) on more complex sounds to determine if there is a match.

In yet another example, the user may want a high tolerance (or relatively loose tolerance level) to ensure that any sound generated in the ambient that is remotely close to a desired audio trigger is detected such that the user is subsequently notified while the apparatus 10 is in the listening mode. For example, consider the situation in which a baby is crying. The chances of matching the exact audible signature of the originally stored recording of the baby crying are more or less remote. In this case, it is desirable for the user to increase the tolerance level associated with the stored sound of the baby crying to be relatively large so that any sound picked up by the microphone 16 that is remotely close to matching the originally recorded version of the baby crying during the listening mode is detected in order to notify the listener that the baby may be crying. The various desired audio triggers when received at the microphone 16 in the configuration mode may be stored in the memory 26.

Alternatively, the audio listening device 12 may be controlled via the user interface 30 to transmit stored desired audio triggers to another audio listening device 12 via the transmitter 28 or alternatively by way of receiving a portable memory device such as a USB, etc. This provides the user with the ability to transmit the stored desired audio triggers to any number of audio listening devices 12 that belong to the user that is used along with the headphones 14 to play back the audio data.

As noted above, the user may also establish or assign a priority level for a stored desired audio trigger. The information pertaining to the priority level for a particular stored desired audio trigger may be stored in the memory 26. The priority levels for each stored desired audio trigger may be used by the audio listening device 12 as a mechanism to determine the intensity in which a search is performed to match an ambient sound to a particular stored desired audio trigger. For example, when the microphone 16 receives an incoming ambient audio signal when the audio listening device 12 is in the listening mode (e.g., the headphones 14 are transmitting audio data as received from the audio listening device 12 to the user), the classifier 22 (or controller 20) initiates a quick search or performs a simple comparison of the incoming ambient audio signal to the stored desired audio trigger to determine if it is necessary to compare additional information on the incoming ambient audio signal to the stored desired audio triggers.

It is also recognized that the audio listening device 12 may be pre-loaded with basic sounds (or audio triggers) such as doorbell chimes, microwave tones, etc. that can be compared to the ambient audio signal. This may enable the audio listening device 12 to determine if there is a match without expending much power from the power supply 21. As noted above, for relatively simple tones when detected at the audio listening device 12, the audio listening device 12 may first execute the Goertzel algorithm. By executing the Goertzel algorithm for simple tones, this may be a less intensive algorithm from a power consumption perspective (e.g., less power and memory intensive) as opposed to the amount of power consumed from the power supply 21 when the audio listening device 12 executes the FFT algorithm. Generally, the audio listening device 12 may enable the user to select a mode via the user interface 30 that allows the audio listening device 12 to detect simple tones by first executing a low processor intensive mechanism, such as, for example, but not limited to the Goertzel algorithm to preserve power consumption. If the audio listening device 12 determines that the tone is more complex by virtue of the Goertzel algorithm not detecting a simple tone, then the audio listening device 12 executes a mid-level processor mechanism such as, for example, but not limited to the FFT to match the incoming audio signal to the desired audio trigger. For example, the incoming audio signal may comprise voice data that may not be detected by the Goertzel algorithm. In this case, the audio listening device 12 executes the FFT after executing the Goertzel algorithm to match the incoming voice data to the desired audio trigger.

The classifier 22 may execute the FFT to determine what percentage of similar frequencies are present in the incoming ambient audio signal and are similar to one or more of the stored desired audio triggers. In the event the classifier 22 determines, based on the FFT, that the percentage of similar frequencies exceeds a predetermined level, the classifier 22 may then perform a deep scan to further compare information on the incoming ambient audio signal to the stored desired audio trigger. With the deep scan, the classifier 22 may execute intensive signal processing to determine if the incoming ambient audio signal indeed matches one of the stored desired audio triggers within the tolerance level for the desired audio trigger. For example, with the deep scan, the audio listening device 12 may execute various speech recognition algorithms to detect a human voice (e.g., the audio listening device 12 may search for combinations of frequencies which when combined, form a phoneme to detect human speech).

By selectively executing low and mid-level processing intensive mechanisms prior to executing a deep scan, this condition may preserve battery/charge of the power supply 21 that powers the audio listening device 12. It is generally difficult for the power supply 21 to consistently perform deep scans on every single incoming ambient audio signal that is received at the microphone 16. Thus, the audio listening device 12 may perform a quick search (e.g., via the Goertzel algorithm as noted above) first, if various conditions are met. This will be discussed in more detail in connection with FIG. 5.

The memory 26 is generally configured to store all of the stored desired audible triggers in addition to each corresponding priority level and tolerance level. In response to the classifier 22 determining that the incoming ambient audio signal matches a stored desired audio trigger, the notifier circuit 24 controls the transmitter 28 to transmit a notification signal to the headphones 14 while in the listening mode to alert the user of the incoming ambient audio signal.

The headphones 14 generally include a controller 40, a transmitter/receiver (Tx/Rx) 42, an attenuator 44, an audible generator 46, and speakers 48. In general, the receiver 42 is configured to receive audio data for playback via the speakers 48. The receiver 42 is also configured to receive the notification signal from the audio listening device 12 in the event the incoming ambient audio signal matches the stored desired audio trigger. In one example, the notification signal may include the actual incoming ambient audio signal that is received at the microphone 16 of the audio listening device 12. In this case, the attenuator 44 may attenuate the audio data that is being played back to enable the user to hear the incoming ambient audio signal. In another example, the notification signal may simply serve as a notifier to the headphones 14 that a match has been detected in connection to the incoming ambient audio signal and a corresponding stored desired audio trigger. In response to the notification signal, the controller 40 may control the audible generator 46 to generate one or more audible alerts (e.g., beeps, or a particular beep sequence, etc.). While FIG. 2 illustrates that the audio listening device 12 and the headphones 14 are separate from one another, it is recognized that the audio listening device 12 and the headphones 14 may be integrated into a single device. In this case, the audio listening device 12 and the headphones 14 may not require wireless communication with one another and may utilize hardware based connections. It is further recognized that the attenuator 44 may be implemented within the audio listening device 12 instead of the headphones 14 and that the audio listening device 12 may perform the attenuation of the audio data that is transmitted to the headphones 14. In addition, the audible generator 46 may provide the audible alert and transmit the same to the headphones 14 if a match is detected between the incoming ambient audio signal and the desired audio trigger.

FIG. 3 generally depicts an operation flow 60 of one aspect of the apparatus 10 in accordance to one embodiment.

In operation 62, the microphone 16 is configured to continuously detect/receive any number of incoming ambient audio signals at the audio listening device 12.

In operation 64, the classifier 22 performs a quick scan and/or a deep scan in connection with the received incoming ambient audio signals to determine if any such received incoming ambient audio signals match a stored desired audio trigger. If the classifier 22 determines that any one of the received incoming ambient audio signals match a stored desired audio trigger, then the flow 60 proceeds to operation 68. If not, then the flow 60 proceeds to operation 66 where such received incoming ambient audio signals are ignored.

In operation 68, the notifier circuit 24 controls the transmitter 28 to transmit the notification signal to alert the user or listener that one of the incoming ambient audio signals matches a stored desired trigger level.

In operation 70, the headphones 14 receive the notification signal and either play back the actual incoming ambient audio signal (e.g., a process version of the incoming ambient audio signal) or provides a beep sequence to alert the user or listener.

Figure 4:
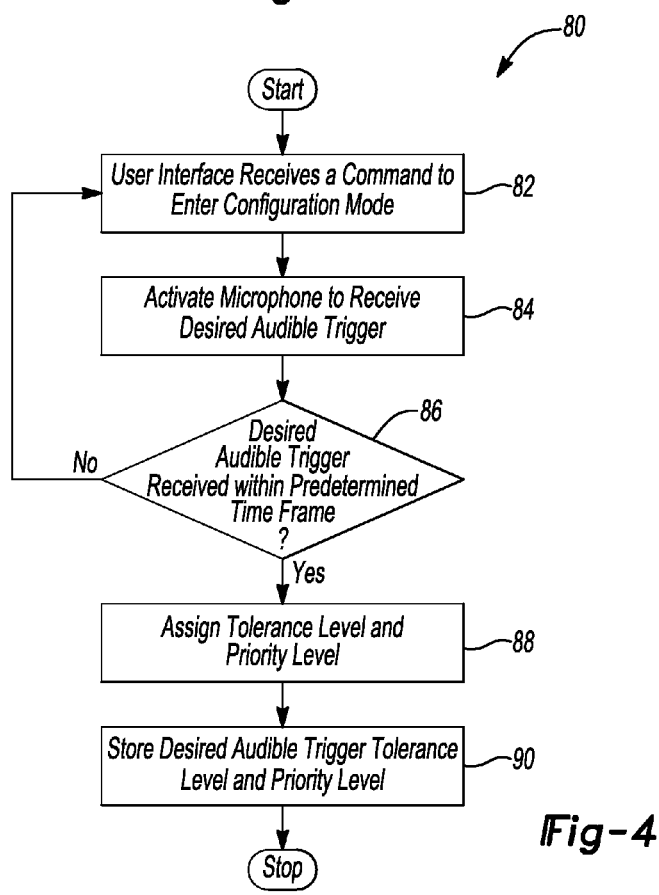
FIG. 4 depicts a method for storing the one or more desired audio triggers in an audio listening device in accordance to one embodiment.

FIG. 4 depicts a method 80 for storing one or more desired audio triggers in the audio listening device 12 in accordance to one embodiment.

In operation 82, the user interface 30 receives a command from the user to enter into the configuration mode. The configuration mode enables the user to store desired audio triggers in the audio listening device 12.

In operation 84, the controller 20 activates the microphone 16 to receive the desired audio trigger.

In operation 86, the user interface 30 prompts the user to provide the desired audio trigger within a predetermined timeframe. The controller 20 keeps the microphone 16 active within the predetermined timeframe in order to receive the desired audio trigger. Upon expiration of the predetermined timeframe, the user interface 30 prompts the user to confirm whether the desired audio trigger was generated and subsequently provided to the microphone 16. If the response from the user (or user interface 30) indicates that the desired audio trigger was received within the predetermined timeframe, then the method 80 proceeds to operation 88.

In operation 88, the user interface 30 prompts the user to assign a tolerance level and a priority level for the desired audio trigger.

In operation 90, the memory 26 stores the desired audio trigger and the assigned tolerance level and priority level for the stored desired audio trigger.

While FIG. 4 depicts the manner in which desired audio triggers can be stored within the audio listening device 12, it is recognized that the audio listening device 12 may also wirelessly receive, for example, pre-recorded desired audio triggers for purposes of comparison to the incoming ambient audio signal. In this case, the audio listening device 12 may be situated with a Bluetooth® transceiver (or other suitable communication protocol and transceiver mechanism) (not shown) to receive the pre-recorded desired audio triggers from another device such as a cell phone or tablet, etc., and store the same in memory 26 thereof. Additionally, the audio listening device 12 may include a port for receiving a memory stick (not shown) with pre-recorded desired audio triggers. The audio listening device 12 may then store selected pre-recorded desired audio triggers in the memory 26.

Figure 5:
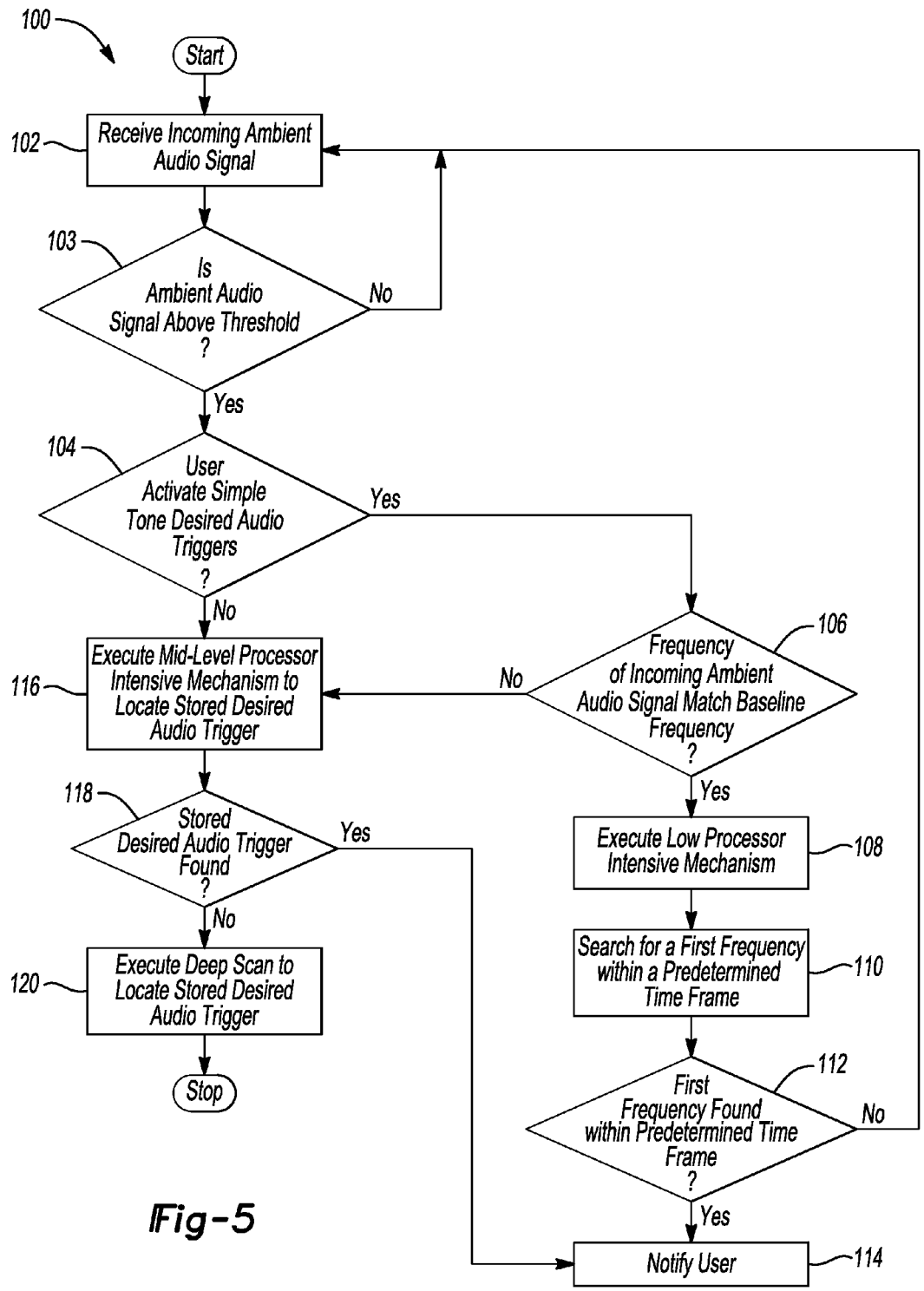
FIG. 5 generally depicts a method for searching for one or more desired audio triggers in accordance to one embodiment.

FIG. 5 generally depicts a method 100 for searching for one or more desired audio triggers in accordance to one embodiment.

In operation 102, the audio listening device 12 receives the incoming ambient audio signal while the audio listening device 12 plays back audio data for the user.

In operation 103, the audio listening device 12 determines whether a sound level of the incoming audio signal is above a predetermined threshold. If this condition is true, then the method 100 proceeds to operation 104. If not, then the method 100 goes back to operation 102.

In operation 104, the audio listening device 12 determines whether a user has activated a simple tone detection mode via the user interface 30 such that the audio listening device 12 may execute the low processor intensive mechanism (or a first processor intensive mechanism) to minimize power consumption. Generally, the audio listening device 12 may enable the user to select a mode via the user interface 30 that allows the audio listening device 12 to detect simple tones with the low processor mechanism first by executing the Goertzel algorithm to preserve power consumption. If this condition is true, then the method 100 moves to operation 106. If not, then the method 100 moves to operation 114.

In operation 106, the controller 20 determines whether a frequency of the incoming ambient audio signal matches a baseline frequency as stored in the memory 26 thereof. The baseline frequency may correspond to a frequency for simple tones such as, for example, a door bell, microwave/oven timer, buzzers, simple polyphonic phone ringtones, etc. If this condition is true, then the method 100 proceeds to operation 108. If not, then the method 100 proceeds to operation 116. Operation 116 will be discussed in more detail below.

In operation 108, the controller 20 executes the low controller intensive mechanism such as, but not limited to, the Goertzel algorithm. As noted above, executing the Goertzel algorithm may not consume a large amount of power and may prolong the power supply 21 that powers the audio listening device 12.

In operation 110, the controller 20 searches for a first frequency that differs from the baseline frequency on the incoming ambient audio signal for a predetermined amount of time. For example, consider that the incoming ambient audio signal is a doorbell. The doorbell may emit a 4 KHz tone (e.g., which corresponds to the baseline frequency as noted in connection with operation 104) that is followed by a 2 KHz tone for a certain duration (or for a predetermined amount of time). In this case, the controller 20 searches for the 2 KHz tone within the predetermined amount of time.

In operation 112, the controller 20 determines whether the first frequency was found within the predetermined amount of time while executing the Goertzel algorithm. If this condition is true, then the method 100 moves to operation 114. If not, then the method 100 moves back to operation 102.

In operation 114, the controller 20 matches the incoming ambient audio signal to the stored desired audio trigger (e.g., the simple tone such as, for example, a door bell, a microwave/oven timer, a buzzer, a simple polyphonic phone ringtone, etc.) and notifies the user of the incoming ambient audio signal. As noted above, in operation 110, if the first frequency was not found within the predetermined amount of time, then the method 100 moves back to operation 102 to wait and receive the next incoming ambient audio signal.

It is recognized that controller 20 and/or the method 100 may be arranged to accommodate hybrid cases in which the incoming ambient audio signal exhibits a high concentration of a particular frequency in a particular sound signature while executing the Goertzel algorithm. For example, in this case, the controller 20 may determine that it is desirable to run the FFT algorithm to examine the high concentration of frequencies after performing the Goertzel algorithm in the event the incoming ambient audio signal exhibits the foregoing condition. If the operation 112 is executed, then there is no need to execute the FFT algorithm.

In operation 116, the audio listening device 12 executes the mid-level processor intensive mechanism such as, but not limited to, the FFT to locate the desired audio trigger. The audio listening device 12 may default to executing the mid-level controller intensive mechanism (or a second processor intensive mechanism) if the user has not activated the simple tone detection mode. Additionally, if the controller 20 determines that the frequency of the incoming ambient audio signal does not match the baseline frequency as stored in the memory 26 thereof, then this condition implies that the incoming ambient audio signal is not a simple tone and a more sophisticated tone. In this case, a more processor intensive mechanism is needed to match the incoming ambient audio signal to the stored desired audio trigger (see negative condition from operation 106).

In general, the audio listening device 12 executes the FFT by capturing, for example, a 20 msec slice of audio on the incoming ambient audio signal in the time domain. The audio listening device 12 converts this into the frequency domain or a set of frequencies. Any number of FFTs may need to be executed to determine if there is a signature over time.

In operation 118, the controller 20 determines whether the incoming ambient audio signal matches a stored desired audio trigger while executing the second controller mechanism. If this condition is true, then the method 100 moves to operation 114. If not, then the method 100 moves to operation 120.

In operation 120, the controller 20 matches the incoming ambient audio signal to the stored desired audio trigger (e.g., a more complicated tone than that of the simple tone (e.g., doorbell, etc.) and notifies the user of the incoming ambient audio signal.

In operation 118, the controller 20 executes a deep scan to match the incoming ambient audio signal to the stored desired audio trigger. For example, as noted above in connection with the deep scan, the classifier 22 may execute intensive signal processing to determine if the incoming ambient audio signal indeed matches one of the stored desired audio triggers within the tolerance level for the desired audio trigger. With the deep scan, the audio listening device 12 may execute various speech recognition algorithms to detect a human voice (e.g., the audio listening device 12 may search for combinations of frequencies which when combined, form a phoneme to detect human speech). This condition may not minimize power consumption when compared to the amount of power consumed by audio listening device 12 when executing the Goertzel algorithm and the FFT.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A headphone listening apparatus comprising:
   an audio listening device programmed to:
      receive an incoming ambient audio signal indicative of an external ambient sound;
      store a plurality of desired audio triggers;
      compare the external ambient sound to the plurality of desired audio triggers; and
      transmit a notification signal to headphones in response to the external ambient sound being generally similar to a first desired audio trigger of the plurality of desired audio triggers, the headphones being programmed to provide an audio alert to a user to indicate the presence of the external ambient sound,
   wherein the audio listening device is further programmed to receive an indication from a user interface to enter into a simple tone detection mode for executing a first processor intensive mechanism to preserve power consumption thereof, and
   wherein the audio listening device is further programmed to compare a first frequency provided on the incoming ambient audio signal to a baseline frequency in response to the indication prior to executing the first processor intensive mechanism.

2. The apparatus of claim 1 wherein the headphones are programmed to provide the audio alert by one of playing back the external ambient sound and playing back a synthesized audio alert.

3. The apparatus of claim 1 wherein the audio listening device is further programmed to execute the first processor intensive mechanism in response to the first frequency being generally similar to the baseline frequency to preserve power consumption.

4. The apparatus of claim 3 wherein the first processor intensive mechanism is a Goertzel algorithm.

5. The apparatus of claim 3 wherein the audio listening device is further programmed to search for a second frequency on the incoming ambient audio signal in response to executing the first processor intensive mechanism.

6. The apparatus of claim 5 wherein the audio listening device is further programmed to determine whether the second frequency has been located within a predetermined time frame in response to executing the first processor intensive mechanism.

7. The apparatus of claim 6 wherein the audio listening device is further programmed to transmit the notification signal to the headphones to notify the user of the presence of the external ambient sound in response to determining that the second frequency has been located within a predetermined time frame.

8. The apparatus of claim 1 wherein the audio listening device is further programmed to execute a second processor intensive mechanism in response to the first frequency not being generally similar to the baseline frequency, the second processor intensive mechanism causing the audio listening device to consume more power than the first processor intensive mechanism.

9. The apparatus of claim 8 wherein the second processor intensive mechanism is a Fast Fourier Transform algorithm.

10. The apparatus of claim 8 wherein the audio listening device is further programmed to compare the external ambient sound to the plurality of desired audio triggers in response to executing the second processor intensive mechanism.

11. The apparatus of claim 10 wherein the audio listening device is further programmed to transmit the notification signal to the headphones in response to the external ambient sound being generally similar to a first desired audio trigger of the plurality of desired audio triggers after executing the second processor intensive mechanism.

12. The apparatus of claim 1 wherein the audio listening device includes a user interface programmed to enable the user to store the plurality of desired audio triggers in memory thereof.

13. The apparatus of claim 12 wherein the user interface is further programmed to enable the user to assign at least one of a tolerance level and a priority level for each of the plurality of desired audio triggers that are stored in memory.

14. The apparatus of claim 1 wherein the audio listening device is further programmed to wirelessly transmit the notification signal to the headphones in response to the external ambient sound being generally similar to a first desired audio trigger of the plurality of desired audio triggers.

15. A computer-program product embodied in a non-transitory computer readable medium that is programmed for headphone listening, the computer-program product comprising instructions to:
receive an incoming ambient audio signal indicative of an external ambient sound,
compare the external ambient sound to a plurality of desired audio triggers stored in memory; and
transmit a notification signal to headphones in response to the external ambient sound being generally similar to a first desired audio trigger of the plurality of desired audio triggers, the headphones being programmed to provide an audio alert to a user to indicate the presence of the external ambient sound,
receive an indication from a user interface to enter into a simple tone detection mode for executing a first processor intensive mechanism to preserve power consumption thereof, and
compare a first frequency provided on the incoming ambient audio signal to a baseline frequency in response to the indication prior to executing the first processor intensive mechanism.

16. The computer-program product of claim 15 further comprising instructions to provide the audio alert by one of playing back the external ambient sound and playing back a synthesized audio alert that differs from the external ambient sound.

17. The computer-program product of claim 15 further comprising instructions to enable the user to store the plurality of desired audio triggers in memory.

18. The computer-program product of claim 17 further comprising instructions to enable the user to assign at least one of a tolerance level and a priority level for each of the plurality of desired audio triggers stored in memory.

19. A headphone listening apparatus comprising:
headphones programmed to receive a notification signal from an audio listening device that (i) receives an incoming ambient audio signal indicative of an external ambient sound, (ii) compares the external ambient sound to a plurality of desired audio triggers stored in memory thereof, (iii) transmits the notification signal to the headphone in response to the external ambient sound being generally similar to a first desired audio trigger of the plurality of desired audio triggers, wherein the headphones are further programmed to provide an audio alert to a user to indicate the presence of the external ambient sound, (iv) receives an indication from a user interface to enter into a simple tone detection mode for executing a first processor intensive mechanism to preserve power consumption thereof, and (v) compares a first frequency provided on the incoming ambient audio signal to a baseline frequency in response to the indication prior to executing the first processor intensive mechanism.

* * * * *